UNITED STATES PATENT OFFICE.

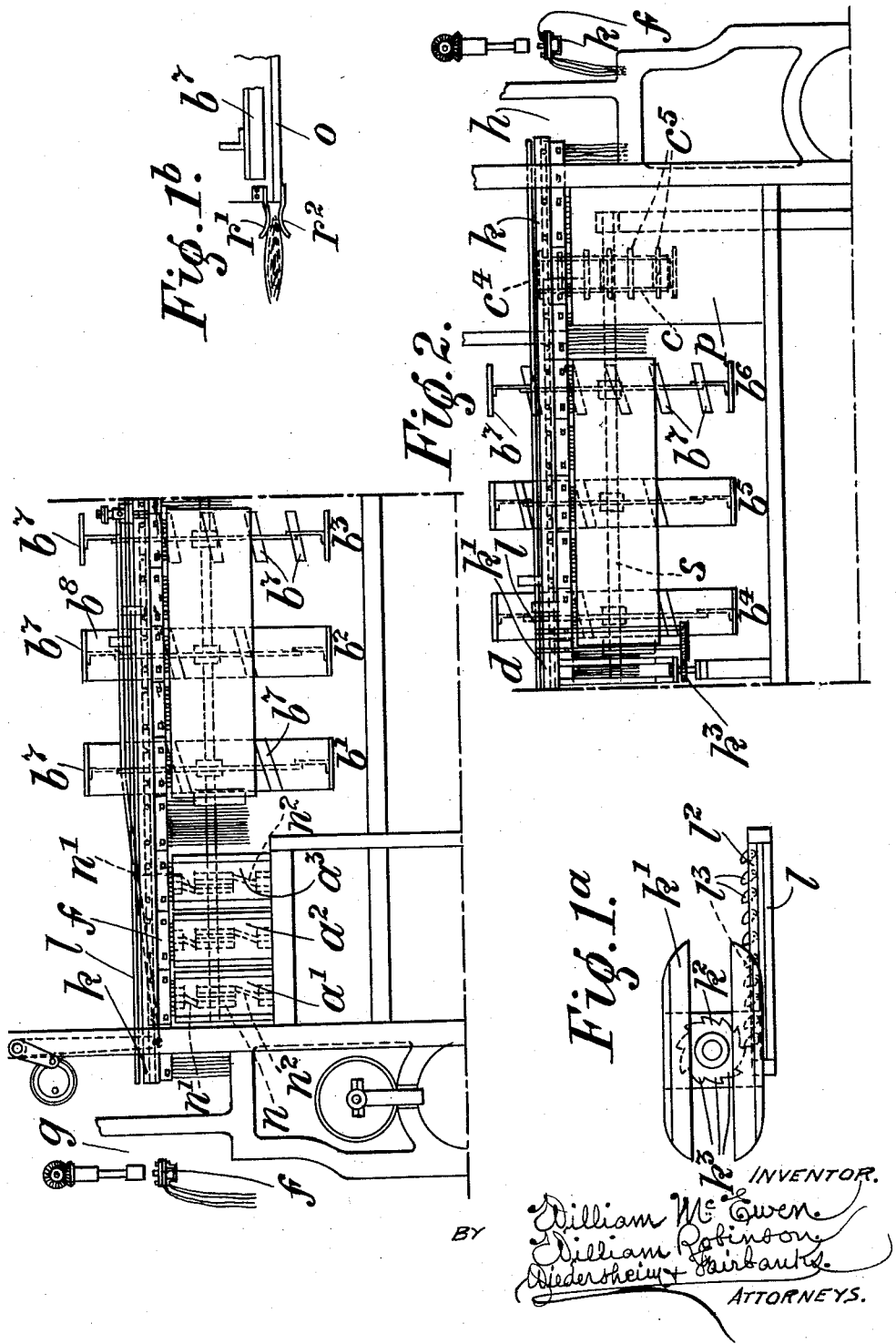

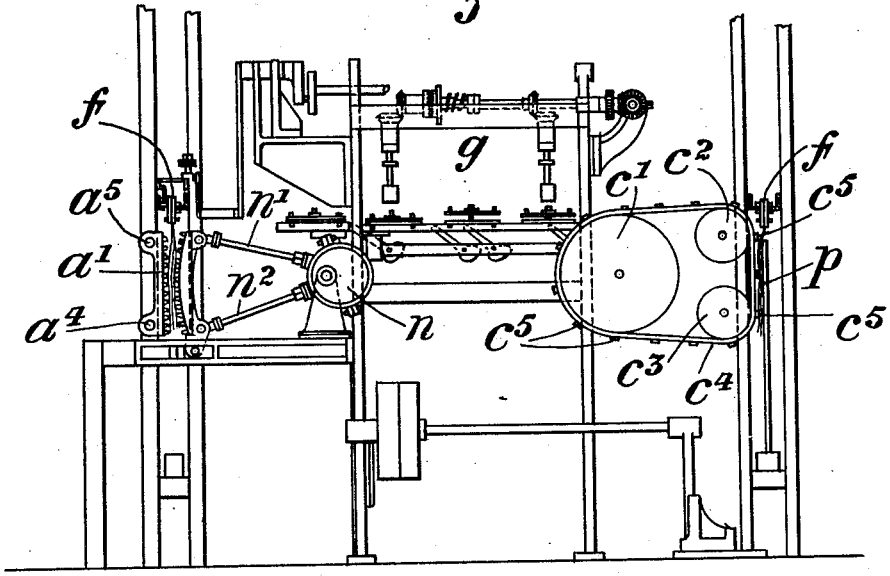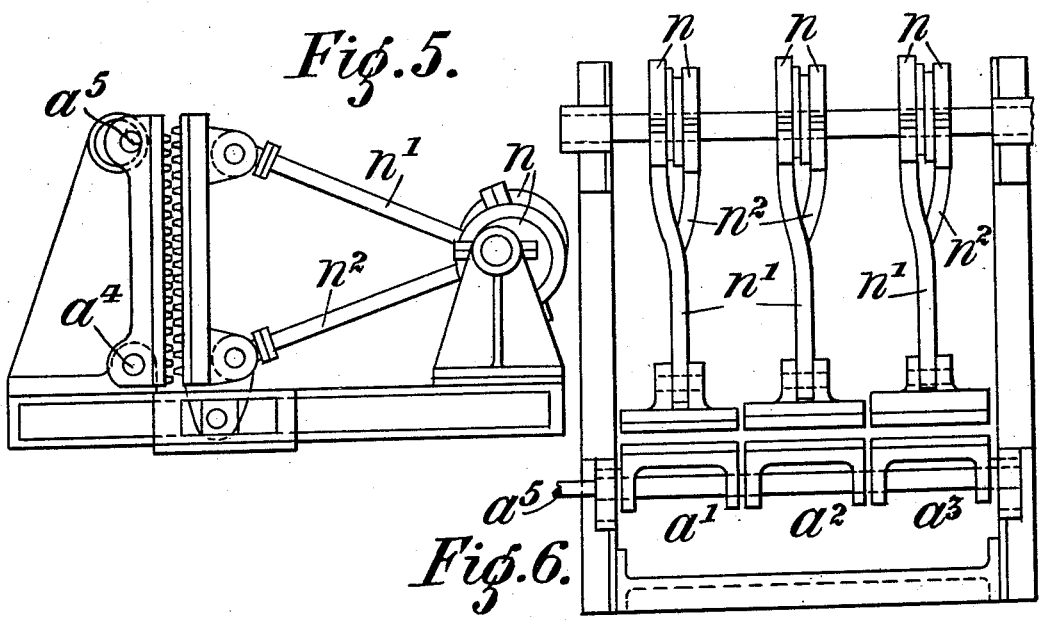

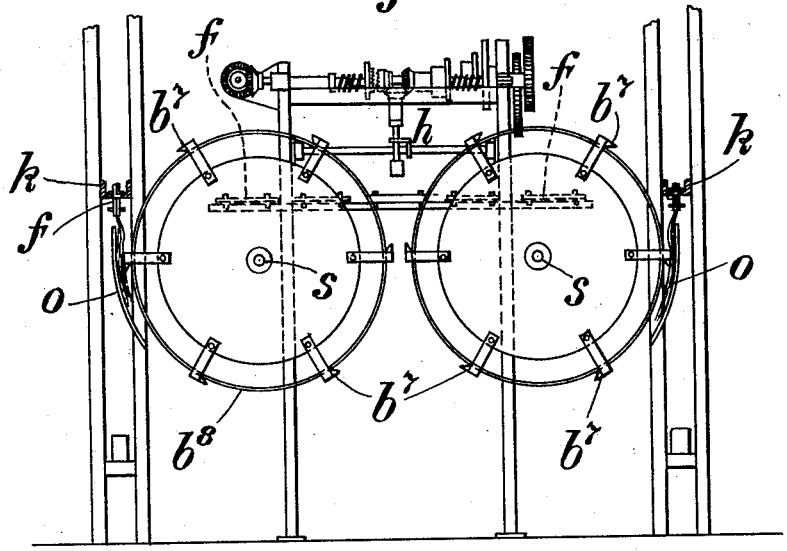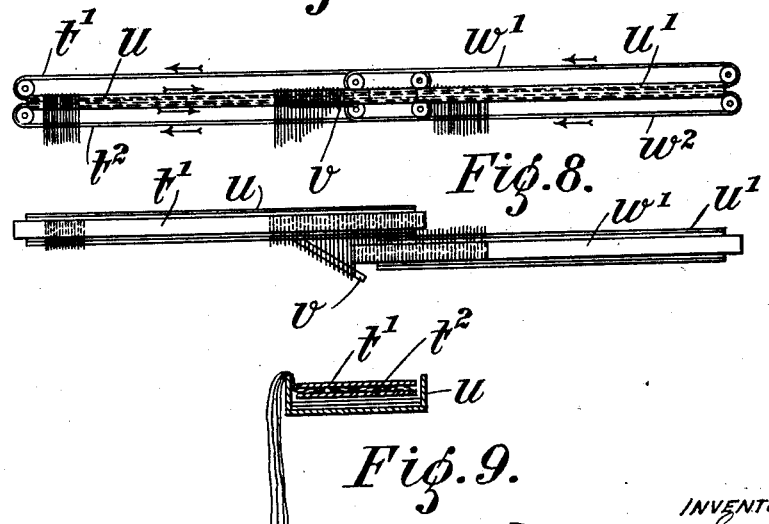

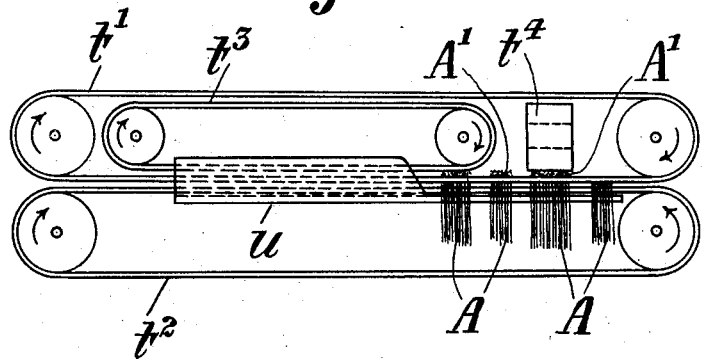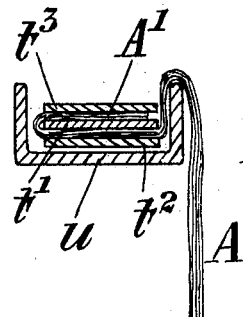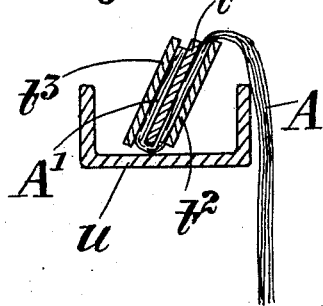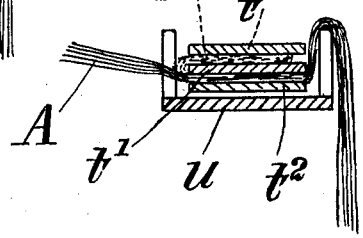

WILLIAM McEWEN, OF BALLYGOWAN, AND WILLIAM ROBINSON, OF BALLYCLOUGHAN, IRELAND; SAID ROBINSON ASSIGNOR TO SAID McEWEN.

FLAX SCUTCHING AND DRESSING APPARATUS.

1,408,460.    Specification of Letters Patent.    Patented Mar. 7, 1922.

Application filed March 1, 1918. Serial No. 219,916.

*To all whom it may concern:*

Be it known that we, WILLIAM McEWEN, residing at Ballygowan, county Down, Ireland, and WILLIAM ROBINSON, residing at Ballycloughan, county Down, Ireland, both subjects of the King of Great Britain and Ireland, have invented certain new and useful Improvements Relating to Flax Scutching and Dressing Apparatus, of which the following is a specification.

This invention relates to the breaking of scutching or beating up and preliminary dressing of flax and its object is to provide improved apparatus for this purpose.

Under the present invention the improved apparatus comprises a framework having means in connection therewith for holding, conveying and treating the flax in its passage through the machine and there is also in connection with the machine means for turning the holding and conveying means whereby both sides of the flax are operated on.

In carrying out the invention the flax is carried along, or round, a rectangular or other frame in suitable holders, or not, as desired, preferably after the manner of a hackling machine, the flax being carried along so that it can be acted on by breaking devices, beating or scutching devices, and a dressing device or equivalent, so as to cause the flax to be broken or crimped, or beaten, or scutched, the arrangement being such that the whole of the flax is subjected to the action of the mechanism.

When holders are used they are preferably made automatically reversible and also automatically releasable in any well known manner.

Instead of holders for carrying the flax, belt or equivalent conveyors may be used.

In apparatus as constructed under this invention, the flax can be under observation and control throughout or at any period of its treatment and the holder devices may, if desired, be so made and operated as to permit of the attendant varying the scutching and (or) dressing of the flax where considered advisable.

The drum or other beaters, and the dressing device, or devices, may be made, arranged, and operated so that they will act alternately, or otherwise, in opposite directions, those acting in one direction scutching or dressing one side of the flax, whilst those acting in the opposite direction scutching or dressing the other side of the flax.

In order that the invention may be understood we have hereunto appended explanatory drawings whereon:—

Fig. 1 is a plan of a flax breaking and scutching mill in accordance with our invention and wherein we employ holders and holder operating gear with filling and changing mechanism after the manner of a hackling machine. The holders are shown in position in the rail at the top of Fig. 1 whilst the rail at the bottom is shown without the holders so as to clearly show the stock and beaters or handles.

Fig. 1$^a$ is a plan view of a central turning portion of the rail which is provided so that both sides of the flax may be scutched from the inside of the machine.

Fig. 1$^b$ is a detail showing a spring device for sorting out the flax as it passes in between the scutching "handles", or beaters, and the stock.

Fig. 2 is a side elevation of the machine.

Fig. 3 is a cross sectional elevation on the line $x, x$, Fig. 1.

Fig. 4 is a cross sectional elevation on the line $y—y$, Fig. 1.

Figs. 5 and 6 are detail views of the breaking devices provided under the invention.

Figs. 7 to 13 show diagrammatically how belt conveyers may be used for conveying the flax instead of the holding devices shown in Figs. 1 and 2.

Referring to the drawings:—

Figure 1:
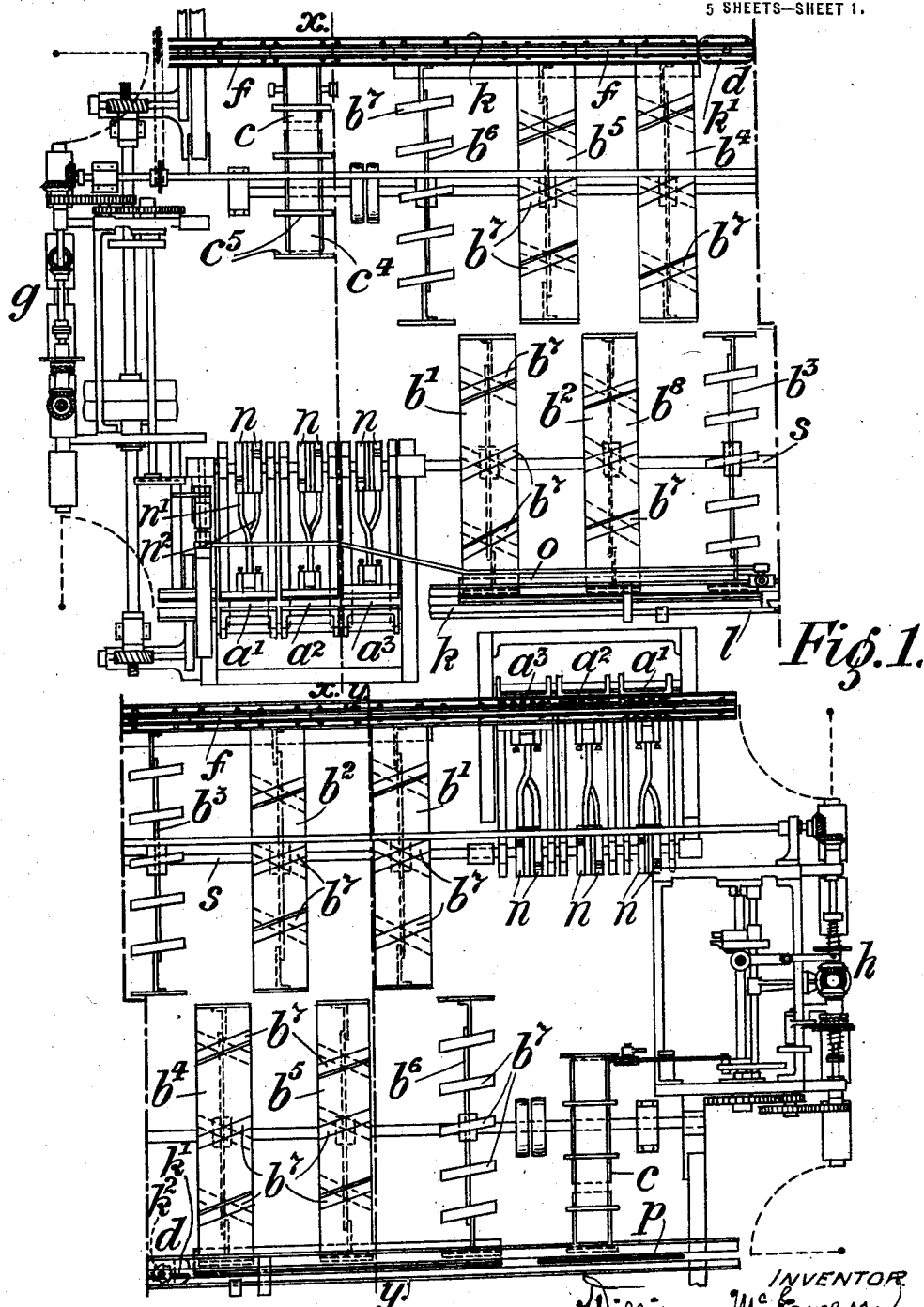

In the example shown in Figs. 1 to 4 we have provided, at each side of the mill or machine, three breaking devices $a^1$, $a^2$, and $a^3$, six beaters or scutchers $b^1$ to $b^6$ and a dressing device $c$. The beaters or scutchers $b^1$ to $b^3$ act on the one side of the flax and the beaters or scutchers $b^4$ to $b^6$ act on the other side, the holders being turned at $d$ to present the undressed side of the flax to the beaters $b^4$ to $b^6$. The flax is carried past the breaking and scutching devices in holders $f$ similar to the holders of a hackling machine, the holders being filled at the filling end $g$ (similar to the filling end of a hackling machine) and pulled through at the changing end $h$ (similar to the changing end of a hackling machine). The holders $f$ are moved along the rails $k$ by mechanism such as used in hackling machines and at the center, at $d$, we provide a turnable section $k^4$ of the rails $k$. The portion $k^1$ is turned through a semi-circle at each backward movement of the holder moving bar $l$ at which times the holders are stationary. The turnable section $k^1$ is supported from below so as to allow free movement of the holders and the turning of the section $k^1$ is effected by providing a ratchet toothed wheel $k^2$ and a spring toothed rack $l^2$ depending from the bar $l$ and having its teeth $l^3$ so made that they are effective in one direction only and act on the toothed wheel $k^2$ to turn same during the backward movement of the rod $l$ and so that during the forward movement the teeth $l^3$ slip over the teeth $k^3$ without affecting the wheel $k^2$.

The breaking devices $a^1$, $a^2$, and $a^3$, as shown in Figs. 1, 2, 3, and also in detail at Figs. 5 and 6, each consist of pairs of toothed plates eccentrically operated. One of the plates is slidably supported and, by means of eccentrics $n$ and rods $n^1$ and $n^2$ is given an inwards and outwards motion combined with a partly rolling motion, or an upward and downward motion relatively to the other plate, whereby the boon or woody matter of the flax is effectively broken. The rods $n^1$, $n^2$, are mounted on two separate eccentrics set out of phase one with the other. The inner or moving plate is shown curved in Fig. 3 whilst the corresponding plate in the detail view, Fig. 5, is shown quite straight. The shape of plates and teeth and also the number and pitch and depth of mesh of the teeth may be varied to give the desired breaking action and it may be found necessary to make variations to suit the flax from different districts.

For the purpose of properly freeing the flax from the breaking devices, each time the holder is to be moved, we preferably make the outer plate capable of a limited movement about the spindle $a^4$ and provide a suitable eccentric or other motion in connection with the top spindle $a^5$ whereby the top of the plate will be moved outwards just before the holder is moved on.

After leaving the breaking devices the flax passes to the scutching or beating devices, which, under our invention, consist of drum beaters $b^1$ to $b^6$ having beaters or "handles" $b^7$ set at suitable angles, and adapted to knock out the shove against curved stock plates $o$, suitably supported.

When the holders, with the flax scutched on one side, reaches the central turnable section $k^1$ it is turned as hereinbefore described and the other side of the flax is presented to the next series of drum beaters, viz., $b^4$ to $b^6$ which act thereon in the same manner as we have just described with reference to the beaters $b^1$ to $b^3$. After having passed the scutching drum $b^6$ the flax is, in the example shown, further treated or finished by a dressing device of the class in which the fibre passes between a rotating surface or surfaces and a fixed surface or surfaces to impart the necessary finish to same. The dressing device consists of three pulleys $c^1$, $c^2$, and $c^3$ with a belt $c^4$ around same and carrying the dressing "handles" $c^5$ so that the latter have a straight down contact with the flax which lies down the face of a flat plate or stock $p$.

When the operations on both sides of one end of the flax are completed the holder is passed on to the changing end $h$ where it is in the known manner pulled through, screwed up, and then passed on to the other side of the mill where the operations are repeated on the untreated portion of the flax so that before it leaves the machine, or mill, the flax is completely prepared for hackling.

At Figs. 1 and 2 and in detail at Fig. 1$^b$ we have shown spring plates $r^1$ and $r^2$ connected with the stock plates $o$ which prevent the flax entering in too thick bundles between the beaters or handles $b^7$ and the plate $o$, the action being similar to the fingers in presenting the flax to the "handles" of a scutch mill by hand.

The breaking devices, beaters and dressing device at each side of the mill are shown on a common shaft $s$ which may be driven in any suitable and convenient manner.

Instead of the holders with their necessarily elaborate and expensive operating gear we may, for small mills, provide a travelling conveyor of the belt type for carrying the flax and presenting it to the brush breaking and scutching devices hereinbefore described. Such an arrangement is shown diagrammatically at Figs. 7, 8 and 9. The flax is fed between belts $t^1$ and $t^2$ supported in a channel $u$, or equivalent, and the portion to be treated lies over the side of the channel as shown in Fig. 9. The beaters or "handles" would probably be arranged so that each alternate beater would act on opposite sides of the flax and in place of the pull through at the changing end of the mill, shown in Figs. 1 to 6, the flax after one end has been treated would, as shown at Figs. 7 and 8, be transferred to another pair of belts $w^1$ and $w^2$ arranged parallel to the belts $t^1$ and $t^2$ and so arranged relatively thereto that by means of the angled guide rod $v$, or equivalent, the treated flax will be caused to pass between the belts $w^1$ and $w^2$ and the untreated portion from between belts $t^1$ and $t^2$ will be allowed to lie over the side of the channel $u^1$ so that as the belts $w^1$ and $w^2$ carry on the flax the untreated portions will be presented to the breaking and scutching devices.

In the modified form of belt conveyor, illustrated at Figs. 10 to 13, three belts $t^1$, $t^2$ and $t^3$, may be used to provide a locking grip on the flax, without the use of weights or springs or such like, a fourth transverse belt $t^4$ being also used in conjunction with the first three belts.

The bundles of flax indicated by the letter A, are inserted between the belts $t^1$ and $t^2$, so that the ends of the bundles project at each side thereof. The bundles are then carried forward in the direction indicated by the arrows and when each bundle reaches the transverse belt $t^4$ the movement thereof causes the end $A^1$ of each bundle to be carried over the top of the inner surface of the belt $t^1$, as shown at Fig. 12, and the further forward movement of the belts $t^1$, $t^2$, brings the end under the belt $t^3$, so that, as shown at Fig. 11, the flax bundles are locked between the belts whilst being carried past the brush breaking and scutching devices.

When passing along the channel $u$ the belts $t^1$, $t^2$, and $t^3$ may be turned on edge, as shown at Fig. 13, one end of each flax bundle hanging over the edge of the channel $u$ in order to facilitate the changing of the end exposed for treatment over the edge of the channel.

Having now fully described our invention, what we claim and desire to secure by Letters Patent is:—

1. In a flax breaking and scutching machine, a frame-work, and breaking mechanism in said frame-work, comprising toothed plates one of which is pivoted, eccentrics out of phase and operatively connected with said plates to actuate them, and means to move both plates to free the material therebetween.

2. In a flax breaking and scutching machine, a frame-work, and breaking mechanism in said frame-work, comprising toothed plates one of which is pivoted, eccentrics out of phase and operatively connected with said plates to actuate them, means to move both plates to free the material therebetween, a plurality of scutching devices, and a dressing device.

3. In a flax breaking and scutching machine, a frame-work, and breaking mechanism in said frame-work, comprising toothed plates one of which is pivoted, eccentrics out of phase and operatively connected with said plates to actuate them, means to move both plates to free the material therebetween, scutching devices in the form of drum beaters having angularly arranged handles, and a dressing device.

4. In a flax breaking and scutching machine, a frame-work, and breaking mechanism in said frame-work, comprising toothed plates one of which is pivoted, eccentrics out of phase and operatively connected with said plates to actuate them, means to move both plates to free the material therebetween, a plurality of scutching devices, and a dressing device, comprising a plurality of belt operated pulleys having dressing handles.

In testimony whereof we affix our signatures in presence of two witnesses.

WILLIAM McEWEN.
WILLIAM ROBINSON.

Witnesses:
ANDREW HAMILTON,
JOHN KNOX.